US012797864B2

(12) United States Patent
Kim

(10) Patent No.: US 12,797,864 B2
(45) Date of Patent: Nov. 17, 2026

(54) ELECTROSTATIC PRECIPITATOR WITH CIRCULATING DUST COLLECTION PLATES

(71) Applicant: U&G TECHNOLOGY CO., LTD., Incheon (KR)

(72) Inventor: Sanguk Kim, Incheon (KR)

(73) Assignee: U&G TECHNOLOGY CO., LTD., Incheon (KR)

( * ) Notice: Subject to any disclaimer, the term of this patent is extended or adjusted under 35 U.S.C. 154(b) by 329 days.

(21) Appl. No.: 18/514,062

(22) Filed: Nov. 20, 2023

(65) Prior Publication Data

US 2024/0173725 A1 May 30, 2024

(30) Foreign Application Priority Data

Nov. 24, 2022 (KR) ........................ 10-2022-0159291

(51) Int. Cl.

| | |
|---|---|
| ***B03C 3/76*** | (2006.01) |
| ***B03C 3/08*** | (2006.01) |
| ***B03C 3/10*** | (2006.01) |
| ***B03C 3/41*** | (2006.01) |
| ***B03C 3/47*** | (2006.01) |
| ***B03C 3/74*** | (2006.01) |
| ***B03C 3/78*** | (2006.01) |
| *B03C 3/38* | (2006.01) |
| *B08B 3/12* | (2006.01) |

(52) U.S. Cl.

CPC ................ *B03C 3/763* (2013.01); *B03C 3/08* (2013.01); *B03C 3/10* (2013.01); *B03C 3/41* (2013.01); *B03C 3/47* (2013.01); *B03C 3/746* (2013.01); *B03C 3/78* (2013.01); *B03C 3/38* (2013.01); *B08B 3/12* (2013.01)

(58) Field of Classification Search

CPC .. B03C 3/763; B03C 3/08; B03C 3/10; B03C 3/41; B03C 3/78; B03C 3/47; B03C 3/746; B03C 3/38; B08B 3/12

USPC .............................................................. 96/15

See application file for complete search history.

(56) References Cited

U.S. PATENT DOCUMENTS 2,535,697 A * 12/1950 Roos ......................... B03C 3/76 96/94

FOREIGN PATENT DOCUMENTS

| | | | | |
|---|---|---|---|---|
| CN | 103008107 A | * | 4/2013 | |
| CN | 111632761 A | * | 9/2020 | B03C 3/025 |
| KR | 101136353 B1 | * | 4/2012 | B03C 3/41 |
| KR | 10-2018-0004050 A | | 1/2018 | |

* cited by examiner

*Primary Examiner* — Jennifer Dieterle
*Assistant Examiner* — Miriam N Ezeluomba
(74) *Attorney, Agent, or Firm* — You & IP, LLC

(57) ABSTRACT

An electrostatic precipitator with circulating dust collection plates is provided, in which, in a housing for electrostatic dust collection that includes an inlet and an outlet formed therein, the dust collection plates are configured so as to be immersed in cleaning water while circulating in response to driving of a circulation drive motor, so that it is possible to automatically clean the dust collection plates without stopping the operation of the electrostatic precipitator, simplify a configuration for cleaning the dust collection plates, save cleaning water for cleaning the dust collection plates, reduce manufacturing costs, and facilitate follow-up management.

4 Claims, 4 Drawing Sheets

ELECTROSTATIC PRECIPITATOR WITH CIRCULATING DUST COLLECTION PLATES

CROSS-REFERENCE TO RELATED APPLICATION

This application claims priority to Korean Patent Applications No. 10-2022-0159291, filed in the Korean Intellectual Property Office on Nov. 24, 2022, the entire contents of which are hereby incorporated by reference.

TECHNICAL FIELD

The present disclosure relates to an electrostatic precipitator with circulating dust collection plates, and more specifically, to an electrostatic precipitator with circulating dust collection plates, which is configured such that the collection plates are immersed in cleaning water while being circulated in response to the driving of a circulation drive motor in a housing for electrostatic dust collection including an inlet and an outlet, thereby not only allowing automatic cleaning of the dust collection plates without stopping the operation of the electrostatic precipitator, but also simplifying the configuration for cleaning the dust collection plates, and also saving the cleaning water required for cleaning the dust collection plates.

BACKGROUND

In general, electrostatic precipitators are provided in incinerators, boiler desulfurization facilities, and other fine dust and harmful gas removal facilities and are widely used to prevent air pollution.

Generally, in this electrostatic precipitator, a high voltage of direct current is applied to a discharge electrode from a high voltage generator, and a (−) electrode is connected to the discharge electrode to apply a (−) charge to the dust particles contained in the air passing between the discharge electrode and a dust collection electrode, so that the dust particles are induced to be attached to the dust collection electrode, which has a relatively positive (+) polarity, thereby removing the dust. These electrostatic precipitators are roughly mainly classified into dry and wet types according to the method of cleaning the dust attached to the dust collection electrode.

The dry electrostatic precipitator employs a method of cleaning by applying a shock to the dust collection electrode by rapping, thereby dropping the attached dust.

Meanwhile, dusts with strong adhesion or stickiness are not easily removed from the dust collection electrode, and reduce the electrical conductivity of the dust collection electrode, causing a problem of lowering dust collection efficiency.

The wet electrostatic precipitator was developed to compensate for the shortcomings of the dry electrostatic precipitator mentioned above, and adopts a method of cleaning the surface of the dust collection electrode by supplying water in an intermittent or continuous manner.

One example is a method of cleaning the dust collection electrode while continuously forming a water film thereon to fundamentally prevent contamination of the dust collection electrode (dust collection plate), which is very useful in treating especially the dust with low resistivity or dust with strong adhesiveness and age hardening.

Meanwhile, the wet electrostatic precipitator has about 100 to 200 electrodes provided in one treatment unit, and serious problems may occur if they are not maintained horizontally.

That is, when assembling more than hundred precipitators, precise assembly is actually difficult and leveling cannot be achieved accurately, and if this occurs, overflowed water does not form an even water film, causing a phenomenon in which water streams are formed in some areas or there are areas where the water film is not formed. This phenomenon immediately leads to the problem of sparking during discharge or the problem of dust attached to the dust collection electrode causing poor discharge, ultimately resulting in the precipitator losing its function, and inconvenience of having to disassemble and clean the same, as well as wasting money and time.

In addition, if the level is not accurate, maintenance is difficult, and not only does it cause the inconvenience of having to flow more water in the direction where the level is higher, but it also causes difficulties in control, which leads to a decrease in the function and shorten the lifespan of the precipitators.

To overcome these problems, a wet electrostatic precipitator has been proposed.

That is, the wet electrostatic precipitator described above includes cylindrical dust collection electrodes provided inside the housing, and a rod-shaped discharge electrode provided at the center of the dust collection electrodes.

In addition, a cap is coupled to the upper side of the dust collection electrodes, discharging a continuous supply of water downward in a spiral manner to form a water film on the inner surface of the dust collection electrodes.

Therefore, when voltage is applied to the discharge electrode from a high voltage supply device, discharge toward the water film occurs, thus charging fine particles such as dusts and causing them to be moved them toward the dust collection electrode by the electric field and collected in the downwardly moving water film and removed.

Meanwhile, the cap has a rim for fixing it to the dust collection electrodes, which protrudes from the entire upper outer peripheral surface, and when an excessive amount of water flows in through the overflow hole, the rising water level is blocked by the rim, making the supply and discharge of water to form the water film difficult.

In addition, in a large-sized wet electrostatic precipitator, it is necessary to fix the discharge electrode to upper and lower supports, but in this case, there is a problem in that the water to form the water film falls downward and contacts the discharge electrode and the lower support, causing a spark discharge.

Taking this into consideration, a "vertical wet electrostatic precipitator" of Korean Patent Publication No. 10-2018-0004050 (Patent Application No. 10-2017-0178135) has been proposed.

To describe the related vertical wet electrostatic precipitator mentioned above, in a vertical wet electrostatic precipitator in which a water film is formed on the inner surface of the dust collection electrode by water supplied from the upper side, and a discharge electrode is provided at the inner center of the dust collection electrodes, a supply water tank is formed outside the upper end of the dust collection electrode, a plurality of inlet holes communicating with the supply water tank are formed radially on the upper outer peripheral surface of the dust collection electrode, a water film forming member including a plurality of inclined discharge grooves formed radially on the outer peripheral surface is coupled to the upper side of the dust collection electrode, a plurality of vertical protrusions are formed radially at intervals upward from the discharge grooves on the outer peripheral surface of the water film forming member, locking protrusions are formed at the upper ends of the vertical protrusions to secure the water film forming member to the dust collection electrode, spaces formed between the vertical protrusions and the discharge grooves and between the vertical protrusions communicate with each other, the inlet holes are formed between the vertical protrusions and the discharge grooves, a discharge water tank is formed below the dust collection electrode, into which water to form the water film falls, a plurality of drain pipes are formed in the discharge tank to discharge water downward, and the discharge water tank is coupled with a drain separator pipe that is inserted into the lower side of the dust collection electrode to prevent spark discharge of the lower support connected to the discharge electrode.

Meanwhile, the related vertical wet electrostatic precipitator configured as described above includes upper and lower spraying units at the inner upper and lower parts, which transfers water from the water tank through a pump and sprays it downward and upward through a plurality of nozzles, respectively, causing a problem of not only the increased size of the equipment of the electrostatic precipitator and production costs, but also a problem that the device has to be temporarily stopped when it is necessary to remove the dust attached to the dust collection electrode.

SUMMARY

Accordingly, the present disclosure has been devised to solve the problems described above, and an object of the present disclosure is to provide an electrostatic precipitator with circulating dust collection plates, in which, in a housing for electrostatic dust collection that includes an inlet and an outlet formed therein, the dust collection plates are configured so as to be immersed in cleaning water while circulating in response to driving of a circulation drive motor, so that it is possible to automatically clean the dust collection plates without stopping the operation of the electrostatic precipitator, simplify a configuration for cleaning the dust collection plates, save cleaning water for cleaning the dust collection plates, reduce manufacturing costs, and facilitate follow-up management.

Other objects of the present disclosure will be clear upon reading the description below.

In order to solve one or more problems (e.g., the problems described above and/or other problems not explicitly described herein), the present disclosure provides an electrostatic precipitator with circulating dust collection plates, which may include a housing 110 for electrostatic dust collection, the housing 110 including an inlet 111 formed on one side through which harmful gas including dust flows, and an outlet 112 formed on the other side through which purified gas can be discharged, in which an interior of the housing 110 may be divided by a partition 113 into two parts, a plurality of first and second guide roller units 120 and 120' formed on both inner surfaces of the housing 110 at intervals from each other in vertical direction, with both ends being rotatable and formed of an insulator, conductive dust collection plates 130 which are connected to a (+) electrode 210 of a high voltage supply unit 200 fixedly provided on the other side of the housing 110, are sequentially wound on the first guide roller unit 120 and the second guide roller unit 120' in a staggered manner, and are formed of a plate-shaped conductor to collect fine particles that are charged in response to application of high voltage, discharge members 140 of which one ends are fixedly provided on left and right sides of front and rear ends of the conductive dust collection plates 130 so as to be connected to a (−) electrode 220 of the high voltage supply unit 200, and the other ends are provided contactlessly between the conductive dust collection plates 130 provided in the staggered manner, and formed of a conductor to apply an electric load to the fine particles which are a source of air pollution, a collection plate circulation drive part 150 provided on one side of a front or rear side of the housing 110 and connected, with one end, to a circulation drive motor 151 driven in response to application of power, and wound around, with the other end, the conductive dust collection plates 130 and rotatably provided inside the housing 110 so as to circulate the conductive dust collection plates 130, and a collection plate cleaning means 160 provided on the partition 113 of the housing 110 and capable of cleaning the conductive dust collection plates 130 to remove collected fine dust while the conductive dust collection plates 130 are circulated in response to the driving of the collection plate circulation drive part 150.

In addition, the discharge members 140 may include the front and rear vertical members 141 and 141' for discharge, which are connected to the (+) electrode 210 of the high voltage supply unit 200 as one ends thereof are fixed to left and right sides of a front end and to front and rear sides of a rear end on an upper surface of the partition 113 of the housing 110, and fixedly provided on the left and right sides of the front and rear ends of the conductive dust collection plates 130, and a plurality of mesh-shaped horizontal net members 142 for discharge, which are provided and positioned between the conductive dust collection plates 130 as both ends are fixedly provided at intervals on inner surfaces of the front and rear vertical members 141 and 141' for discharge.

As described above, according to the electrostatic precipitator with circulating dust collection plates according to the present disclosure, in a housing for electrostatic dust collection that includes an inlet and an outlet formed therein, the dust collection plates are configured so as to be immersed in cleaning water while circulating in response to driving of a circulation drive motor, so that it is possible to automatically clean the dust collection plates without stopping the operation of the electrostatic precipitator, simplify a configuration for cleaning the dust collection plates, save cleaning water for cleaning the dust collection plates, reduce manufacturing costs, and facilitate follow-up management.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
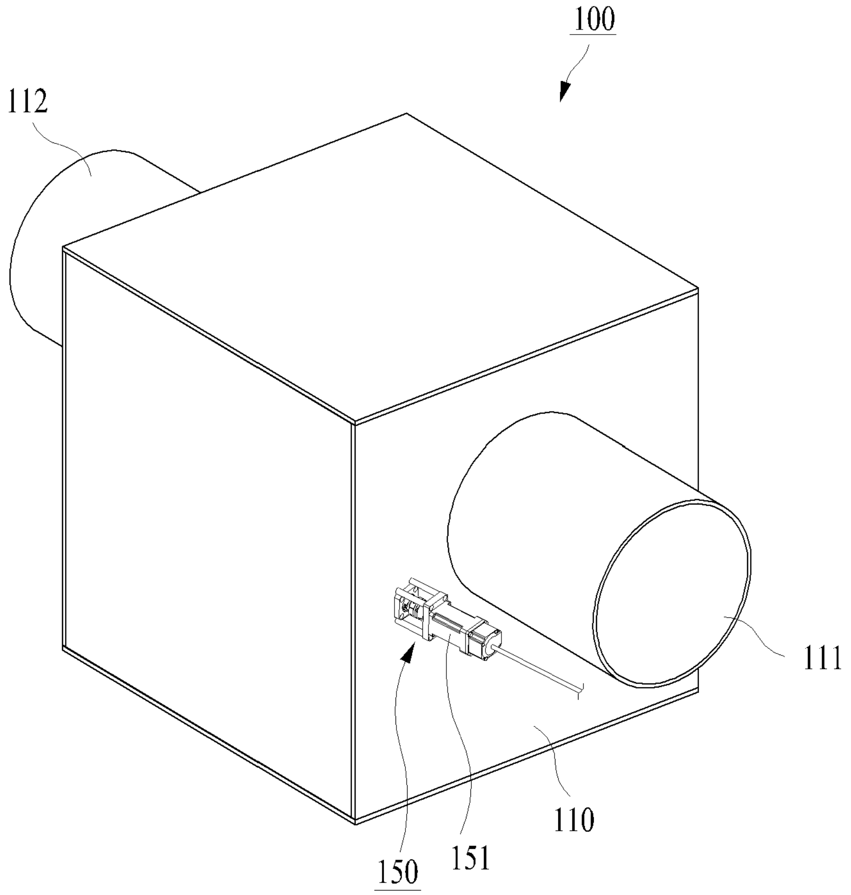
FIG. 1 is a perspective view of an electrostatic precipitator with circulating dust collection plates according to the present disclosure.

Hereinafter, an embodiment of an electrostatic precipitator with circulating dust collection plates according to the present disclosure will be described in detail.

First, it should be noted that among the drawings, identical components or parts are given the same reference numerals as much as possible. In describing the present disclosure, detailed descriptions of the related well-known functions or configurations are omitted in order to not obscure the gist of the disclosure.

As shown, an electrostatic precipitator 100 with circulating collection plates according to the present disclosure includes a housing 110 including an inlet 111 formed on one side through which harmful gas including dust flows, and an outlet 112 formed on the other side through which purified gas can be discharged, in which an interior of the housing 110 is divided into two parts, that is, into first and second space parts by a partition 113, a plurality of first and second guide roller units 120 and 120' formed on both inner surfaces of the housing 110 at intervals from each other in vertical direction, with both ends being rotatable and formed of an insulator, conductive dust collection plates 130 which are connected to a (+) electrode 210 of a high voltage supply unit 200 fixedly provided on the other side of the housing 110, are sequentially wound on the first guide roller unit 120 and the second guide roller unit 120' in a staggered manner, and are formed of a plate-shaped conductor to collect fine particles that are charged in response to application of high voltage, discharge members 140 of which one ends are fixedly provided on left and right sides of front and rear ends of the conductive dust collection plates 130 so as to be connected to a (−) electrode 220 of the high voltage supply unit 200, and the other ends are provided contactlessly between the conductive dust collection plates 130 provided in the staggered manner, and formed of a conductor to apply an electric load to the fine particles which are a source of air pollution, a collection plate circulation drive part 150 provided on one side of a front or rear side of the housing 110 and connected, with one end, to a circulation drive motor 151 driven in response to application of power, and wound around, with the other end, the conductive dust collection plates 130 and rotatably provided inside the housing 110 so as to circulate the conductive dust collection plates 130, and a collection plate cleaning means 160 provided on the partition 113 of the housing 110 and capable of cleaning the conductive dust collection plates 130 to remove collected fine dust while the conductive dust collection plates 130 are circulated in response to the driving of the collection plate circulation drive part 150.

Figure 2:
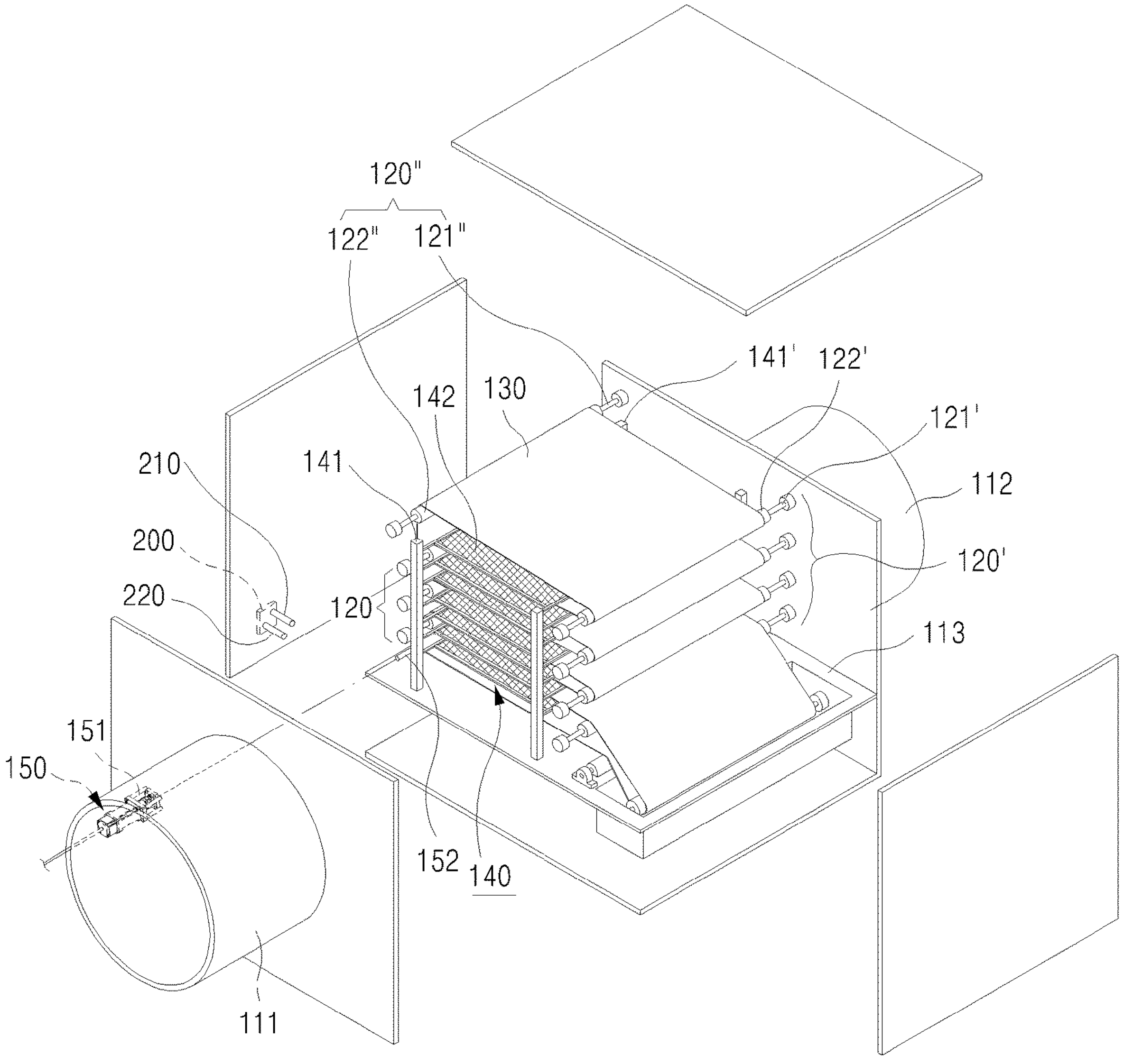
FIG. 2 is a partial exploded view of an electrostatic precipitator with circulating dust collection plates according to the present disclosure.
Figure 3:
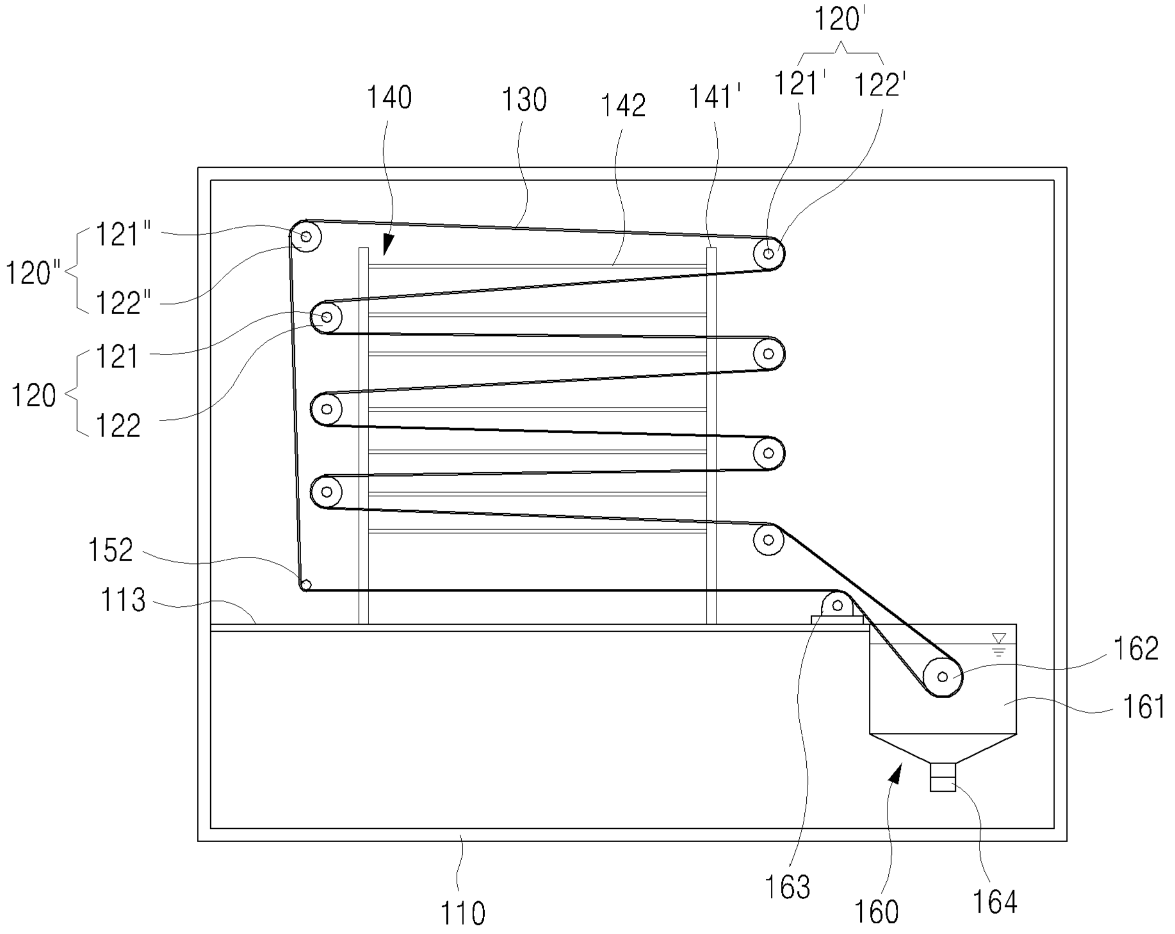
FIG. 3 is a cross-sectional view of an electrostatic precipitator with circulating dust collection plates according to the present disclosure.
Figure 4:
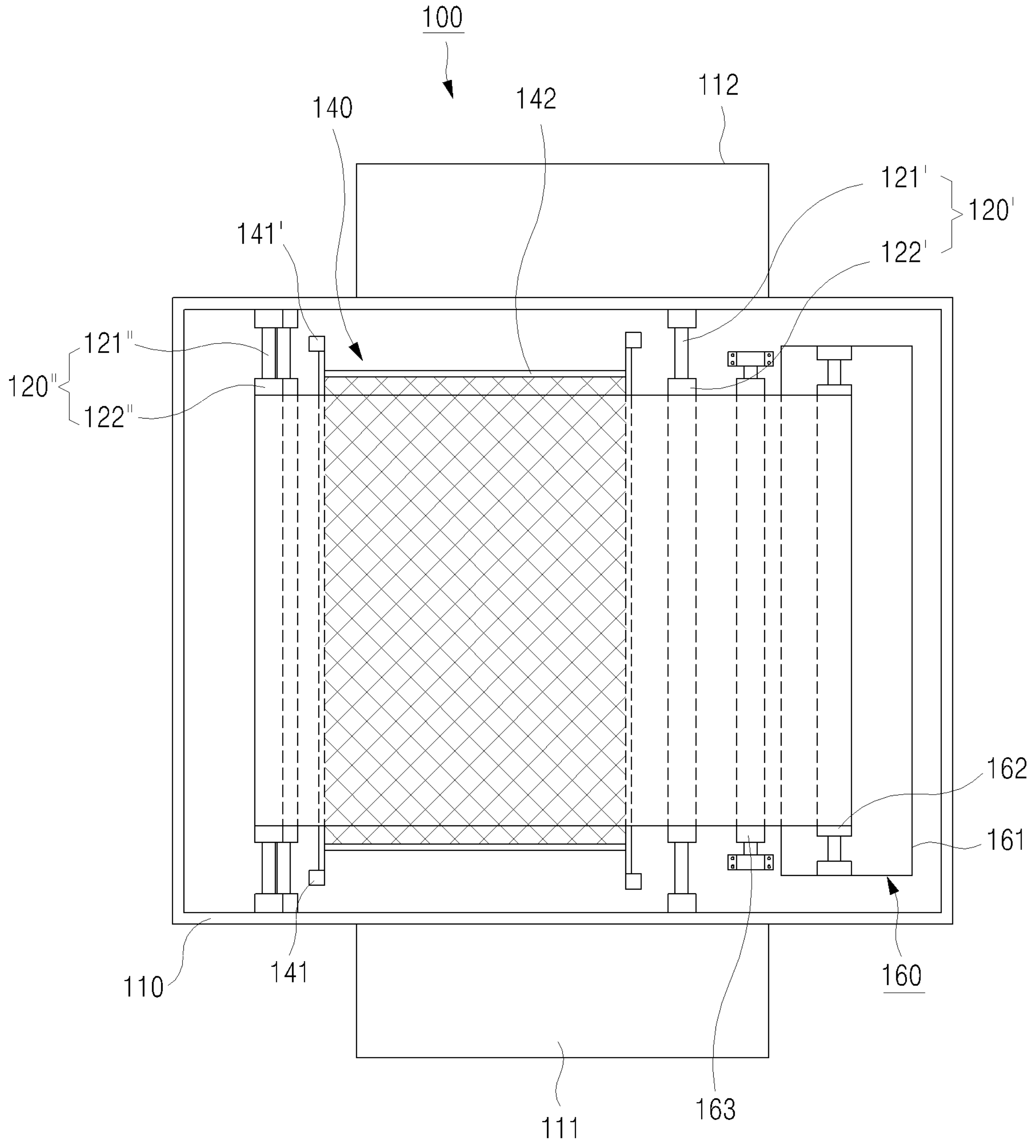
FIG. 4 is a plan view of the interior of an electrostatic precipitator with circulating dust collection plates according to the present disclosure.

Hereinafter, the electrostatic precipitator with circulating dust collection plates according to the present disclosure described above will be described in more detail with reference to the accompanying drawings FIGS. 1 to 4.

First, the housing 110 of the electrostatic precipitator with circulating dust collection plates according to the present disclosure is formed as an enclosure in a polygonal shape including a circular shape, and includes the inlet 111 formed on the front side through which harmful gas including dust flow in, and the outlet 112 formed on the rear side through which gas purified by the discharge members and the conductive dust collection plates is discharged.

In addition, the housing 110 further includes the partition 113 formed inside the housing 110 and the partition 113 is spaced apart from a bottom surface to form a space where the collection plate cleaning means 160 is provided.

The plurality of first and second guide roller units 120 and 120' described above are provided on both inner surfaces of the housing 110 at intervals from each other in vertical direction, with both ends being rotatable and formed of an insulator such that the conductive dust collection plates can be circulated in response to the driving of the collection plate circulation drive part. A third guide roller unit (120") is also provided at a left side of the first guide roller units (120) such that the third guide roller unit (120") is located between the first guide roller units (120) and a left wall of the housing (110). Both ends of the third guide roller unit are rotatable and formed of an insulator such that the conductive dust collection plates can be circulated in response to the driving of the collection plate circulation drive part.

That is, the first and second guide roller units 120 and 120' are formed of an insulator and includes a plurality of first and second guide fixing rods 121 and 121' provided and positioned above the partition 113 by both ends thereof being fixed to the front and rear inner surfaces of the housing 110, and first and second guide rotating parts 122 and 122' rotatably provided on the first and second guide fixing rods 121 and 121', respectively, so as to circulate the conductive dust collection plates 130 in response to the driving of the collection plate circulation drive part 150. The third guide roller unit 120" is formed of an insulator and includes a third guide fixing rod 121" provided and positioned above the partition 113 by both ends thereof being fixed to the front and rear inner surfaces of the housing 110, and a third guide rotating part 122" rotatably provided on the third guide fixing rod 121" so as to circulate the conductive dust collection plates 130 in response to the driving of the collection plate circulation drive part 150.

The conductive dust collection plates 130 are connected to the (+) electrode 210 of the high voltage supply unit 200 fixedly provided on the other side of the housing 110, are sequentially wound on the first guide roller unit 120 and the second guide roller unit 120' in a staggered manner, and are formed of a conductor to collect fine particles that are charged in response to application of high voltage, That is, the conductive dust collection plates 130 are formed in a plate shape so as to be wound sequentially on the first and second guide rotating parts 122 and 122' of the first guide roller unit 120 and the second guide roller unit 120' in a staggered manner so as not to be contacted with discharge members 140 and so as to be connected to the (+) electrode 210 of the high voltage supply unit, thereby collecting charged fine particles in response to the application of high voltage.

The high voltage supply unit 200 is fixedly provided on one side of the housing 110 to be connected to a high voltage supply line, and configured with, formed on one end, the (+) electrode 210 connected to the conductive dust collection plates 130 and the (−) electrode 220 connected to the discharge members 140. Since this configuration is found in a known electrostatic precipitator, detailed description thereof will be omitted.

One ends of the discharge members 140 are fixedly provided on the left and right sides of the front and rear ends of the conductive dust collection plates 130 so as to be connected to the (−) electrode 220 of the high voltage supply unit 200 that supplies voltage from 5,000 voltes to 20,000 volts, and the other ends are provided contactlessly between the conductive dust collection plates provided in the staggered manner, and are formed of a conductor to apply an electric load to the fine particles which are a source of air pollution.

That is, the discharge members 140 described above include: the front and rear vertical members 141 and 141' for discharge, which are connected to the (+) electrode 210 of the high voltage supply unit 200 as one ends thereof are fixed to left and right sides of a front end and to front and rear sides of a rear end on an upper surface of the partition 113 of the housing 110, and fixedly provided on the left and right sides of the front and rear ends of the conductive dust collection plates 130; and a plurality of mesh-shaped horizontal net members 142 for discharge, which are provided and positioned between the conductive dust collection plates 130 as both ends are fixedly provided at intervals on inner surfaces of the front and rear vertical members 141 and 141' for discharge.

The collection plate circulation drive part 150 is provided on one side of the front or rear side of the housing 110 and connected, with one end, to the circulation drive motor 151 driven in response to application of power, and wound around, with the other end, the conductive dust collection plates 130 and rotatably provided inside the housing 110 so as to circulate the conductive dust collection plates 130.

That is, the collection plate circulation drive part 150 described above includes: the circulation drive motor 151 fixedly provided on one side of the front side of the housing 110 with a drive shaft located inside the housing 110 so as to be driven in response to power being applied; and a rotation shaft 152 for circulation, with one end fixedly connected to the circulation drive motor 151 and the other end rotatably provided on a rear inner surface of the housing 110, in which an outer peripheral surface is wound around the conductive dust collection plates 130 so as to circulate the conductive dust collection plates 130 in response to the driving of the circulation drive motor 151.

The circulation drive motor 151 is configured to move the conductive dust collection plates 130 at a rate of 5 cm to 12 cm per minute such that fine dust attached to the conductive dust collection plates 130 can be cleaned.

In addition, although it is illustrated above that the electrostatic precipitator with circulating dust collection plates according to the present disclosure described above is configured to circulate the conductive dust collection plates with a single collection plate circulation drive part, aspects are not limited thereto, and another circulation drive part having the same configuration as the collection plate circulation drive part described above may be further provided on one upper rear surface of the housing.

The collection plate cleaning means 160 is provided on the partition 113 of the housing 110 and capable of cleaning the conductive dust collection plates 130 to remove the collected fine dust while the conductive dust collection plates 130 are circulated in response to the driving of the collection plate circulation drive part 150.

That is, the collection plate cleaning means 160 described above includes: a cleaning water storage 161 provided on one side of the partition 113 of the housing 110 to store cleaning water; a cleaning roller 162 wound with the conductive dust collection plates 130 in the cleaning water storage 161 so as to rotatably submerge the conductive dust collection plates 130 in the cleaning water; a cleaning guide roller 163 rotatably provided on one side of the cleaning water storage 161 with a fixing bracket by interposing a bearing, the cleaning guide roller 163 for winding and circulating the conductive dust collection plates 130; and a cleaning ultrasonic generator 164 fixedly provided on a lower surface of the cleaning water storage 161 and driven in response to the application of power to generate ultrasonic waves.

When the electrostatic precipitator with circulating dust collection plates according to the present disclosure as described above is provided and driven in a place where harmful gas including dust are discharged, the harmful gas including dust flows in through the inlet 111 of the housing 110 as shown in FIGS. 1 to 4.

As described above, the harmful gas containing dust flows through the inlet 111 of the housing 110, and the dust in the air charged by the corona discharge of the discharge members 140 is collected on the conductive dust collection plates 130 which are wound in a staggered manner on the first and second guide roller units 120 and 120' and circulated by the collection plate circulation drive part 150.

That is, when corona discharge occurs by the application of high voltage to the discharge members 140, a large amount of electrons move toward the conductive dust collection plates 130, and the air molecules between the discharge members 140 and the conductive dust collection plates 130 are ionized by combining with electrons. Accordingly, the dust is charged by the combination of the ionized air molecules and the dust, and dust in the air is collected in the conductive dust collection plates 130 by the principle that electrical Coulomb force acts between the charged dust particles and the grounded conductive dust collection plates 130, causing the dust to be attached to the surface of the charged conductive dust collection plates 130.

As described above, the dust collected on the conductive dust collection plates 130 is cleaned by collection plate cleaning means 160 while being circulated by the driving of the collection plate circulation drive part 150.

That is, the conductive dust collection plates 130 with the dust collected thereon are submersed in the cleaning water storage 161 of the collection plate cleaning means 160 where the cleaning water is stored by the driving of the collection plate circulation drive part 150, and the dust collected in the conductive dust collection plates 130 is removed during circulation.

As described above, the electrostatic precipitator with circulating dust collection plates according to the present disclosure can not only easily remove the dust collected in the conductive dust collection plates 130 without stopping the operation, but also remove the collected dust with the collection plate cleaning means 160, thereby easily removing the collected dust even with a small amount of cleaning water.

The above description is merely illustrative of the technical idea of the present invention, and those of ordinary skill in the art to which the present invention pertains will be able to make various modifications and variations without departing from the essential characteristics of the present invention. Accordingly, the embodiments described herein in the present invention are not intended to limit the technical idea of the present invention, but to explain the technical idea, and the scope of the technical idea of the present invention is not limited by these an embodiment. The scope of protection of the present invention should be interpreted by the following claims, and all technical ideas within the scope equivalent thereto should be construed as being included in the scope of the present invention.

The invention claimed is:

1. An electrostatic precipitator with circulating dust collection plate, comprising:

a housing for electrostatic dust collection, the housing comprising:

an inlet formed on a front side of the housing through which harmful gas including dust is configured to flow, an outlet formed on a rear side of the housing through which purified gas is configured to be discharged, and a partition having a plate shape and spaced apart from a bottom wall of the housing, the partition dividing an interior of the housing into an upper part and a lower part;

a cleaning water storage provided at an end portion of the partition and configured to store cleaning water;

discharge members fixedly provided on the partition and including:

horizontal mesh members arranged at intervals from each other in a vertical direction, and vertical members disposed on the partition and supporting the horizontal mesh members;

a plurality of guide roller units provided in the interior of the housing, the plurality of guide roller units including:

first guide roller units provided at a left side of the discharge members and arranged at intervals from each other in a vertical direction;

second guide roller units provided at a right side of the discharge members and arranged at intervals from each other in a vertical direction;

a third guide roller unit provided at an upper left side of the first guide roller units such that the third guide roller unit is located between the first guide roller units and a left wall of the housing;

a rotation shaft provided at the lower left side of the first guide roller units such that the rotation shaft is located between the first guide roller units and the left wall of the housing, the rotation shaft extending from the front side to the rear side of the housing and being fixedly connected to a circulation drive motor provided on a front wall of the housing;

a cleaning quide roller mounted on the partition adjacent to the cleaning water storage via a bearing and a fixing bracket; and a cleaning roller unit provided inside the cleaning water storage; and a conductive dust collection plate formed of an endless plate-shaped conductor and wound around the first guide roller units, the second guide roller units, the third guide roller unit, the rotation shaft, the cleaning guide roller, and the cleaning roller unit, wherein the conductive dust collection plate circulates around the first guide roller units and the second guide roller units in a staggered manner, and wherein the circulation drive motor is configured to circulate the conductive dust collection plate.

2. The electrostatic precipitator of claim 1, further comprising:

a cleaning ultrasonic generator fixedly provided on a lower side of the cleaning water storage and configured to remove collected fine dust from the conductive dust collection plate while the conductive dust collection plate passes through the cleaning water storage.

3. The electrostatic precipitator of claim 1, further comprising:

a high voltage supply unit fixedly provided on a wall of the housing, the high voltage supply unit including:

a positive (+) electrode, and a negative (−) electrode, wherein the discharge members are connected to the negative (−) electrode of the high voltage supply unit and configured to discharge the harmful gas, and the conductive dust collection plate is connected to the positive (+) electrode of the high voltage supply unit and configured to collect fine particles charged by application of high voltage.

4. The electrostatic precipitator of claim 1, wherein the vertical members have a height smaller than a height of the housing such that a space is formed between upper portion of the discharge members and a top wall of the housing, wherein a portion of the conductive dust collection plate is configured to pass the space.

* * * * *